US010454108B2

(12) United States Patent
Kumakura et al.

(10) Patent No.: US 10,454,108 B2
(45) Date of Patent: Oct. 22, 2019

(54) BIVALENT METAL DOPING FOR SODIUM MANGANESE OXIDE AS CATHODE MATERIALS FOR SODIUM ION BATTERIES

(71) Applicants: Umicore, Brussels (BE); Tokyo University of Science Foundation, Tokyo (JP)

(72) Inventors: Shinichi Kumakura, Kobe (JP); Shinichi Komaba, Tokyo (JP); Kei Kubota, Tokyo (JP); Yoshiyuki Tahara, Tokyo (JP)

(73) Assignees: UMICORE, Brussels (BE); TOKYO UNIVERSITY OF SCIENCE FOUNDATION, Tokyo (JP)

( * ) Notice: Subject to any disclaimer, the term of this patent is extended or adjusted under 35 U.S.C. 154(b) by 23 days.

(21) Appl. No.: 15/575,462

(22) PCT Filed: May 20, 2016

(86) PCT No.: PCT/EP2016/061364
§ 371 (c)(1),
(2) Date: Nov. 20, 2017

(87) PCT Pub. No.: WO2016/188877
PCT Pub. Date: Dec. 1, 2016

(65) Prior Publication Data
US 2018/0166686 A1 Jun. 14, 2018

(30) Foreign Application Priority Data

May 26, 2015 (EP) .................................. 15169133
Sep. 4, 2015 (EP) .................................. 15183815

(51) Int. Cl.
| | | |
|---|---|---|
| H01B 1/06 | (2006.01) |
| H01M 4/525 | (2010.01) |
| H01M 4/505 | (2010.01) |
| C01G 45/12 | (2006.01) |
| C01G 53/00 | (2006.01) |
| H01M 10/054 | (2010.01) |
| H01M 10/058 | (2010.01) |
| H01M 4/02 | (2006.01) |

(52) U.S. Cl.
CPC ........ *H01M 4/505* (2013.01); *C01G 45/1228* (2013.01); *C01G 53/50* (2013.01); *H01M 4/525* (2013.01); *H01M 10/054* (2013.01); *H01M 10/058* (2013.01); *C01P 2002/72* (2013.01); *C01P 2002/76* (2013.01); *C01P 2004/60* (2013.01); *C01P 2006/40* (2013.01); *H01M 2004/028* (2013.01)

(58) Field of Classification Search
CPC ........... H01M 2004/028; H01M 4/505; H01M 4/485; H01M 4/136; H01M 4/48; H01B 1/06; H01B 1/08
See application file for complete search history.

(56) References Cited

U.S. PATENT DOCUMENTS

| | | | |
|---|---|---|---|
| 9,728,781 B2 * | 8/2017 | Han | .................... H01M 4/505 |
| 2010/0248040 A1 | 9/2010 | Saito | |
| 2011/0200879 A1 | 8/2011 | Saito | |

FOREIGN PATENT DOCUMENTS

| | | |
|---|---|---|
| CN | 103840149 A | 6/2014 |
| CN | 104617288 | 5/2015 |
| JP | 11317226 A | 11/1999 |
| JP | 2009209037 A | 9/2009 |
| JP | 2014010973 A | 1/2014 |
| JP | 2014143013 A | 8/2014 |
| JP | 2014160653 A | 9/2014 |
| JP | 2015097161 A | 5/2015 |
| KR | 20170116996 A | 10/2017 |
| WO | 2014132174 | 9/2014 |

OTHER PUBLICATIONS

English Translation of CN 103840149 dated Jun. 4, 2014 (Year: 2014).*
Chad W Mason, et al., "Beyond Divalent Copper: A Redox Couple for High Volume Sodium Ion Battery Cathode Materials", ECS Electrochemistry Letters, Mar. 19, 2015, pp. A41-A44, vol. 4, No. 5.
Chad W Mason, et al., "Supplementary Information Beyond Divalent Copper: A Redox Couple for High Volume Sodium Ion Battery Cathode Materials", Mar. 19, 2015.
Juliette Billaud, et al., "Na 0.67 Mn 1-x Mg x O 2 (0=x=0.2): A High-Capacity Cathode for Sodium Ion Batteries", Energy & Environmental Science, Feb. 21, 2014, vol. 7, No. 4, pp. 1387-1391.
Juliette Billaud, et al., "Electronic Supplementary Material (ESI) to the article titled Na 0.67 Mn 1-x Mg x O 2 (0=x=0.2): A High-Capacity Cathode for Sodium Ion Batteries", Energy & Environmental Science, Feb. 21, 2014, vol. 7, No. 4.
EPO, Supplementary European Search Report for European Patent Application No. 15169133, dated Jul. 22, 2015.
EPO, Supplementary European Search Report for European Patent Application No. 15183815, dated Mar. 2, 2016.
Taiwan IPO Search Report for Taiwan Patent Application No. 105115785, dated Mar. 1, 2017.
Shu-Yin, Xu, et al., Novel copper redox-based cathode materials for room-temperature sodium-ion batteries, Chin. Phys. B, Sep. 29, 2014, pp. 118202-1-118202-4, vol. 23, No. 11.
Robertson, Alastair D., et al., Nonstoichiometric layered LixMnyO2 intercalation electrodes: a multiple dopant strategy, Journal of Materials Chemistry, Jul. 10, 2003, pp. 2367-2373, vol. 13, No. 9.

(Continued)

*Primary Examiner* — Haidung D Nguyen
(74) *Attorney, Agent, or Firm* — NK Patent Law

(57) ABSTRACT

A sodium transition metal based cathode material for a rechargeable sodium battery, having a P2 orthorhombic layered bronze crystal structure with space group Cmcm, and having a composition $Na_xM_yMn_{1-y}Li_{y'}A_zO_2$ with $0.60<x<0.95$, wherein M consists of either one or more elements of the group consisting of Cu, Zn and Ni; A consisting of either one or more elements of the group consisting of Mg, Ti, Fe, Cr and Co, with $0<y<0.20$, $0\leq z<0.2$, $0\leq y'<0.33$, and $z+y'>0$.

14 Claims, 9 Drawing Sheets

(56) References Cited

OTHER PUBLICATIONS

Doeff, Marc M., et al., Synthesis and characterization of a copper-substituted manganese oxide with the Na{sub 0.44}MnO{sub 2} structure, retrieved from internet URL:https://www.osti.gov/biblio/823441-aaUn2S, Sep. 16, 2002, pp. 1-15.
Eriksson, Tom A., et al, Influence of Substitution on the Structure and Electrochemistry of Layered Manganese Oxides,Chem. Mater., 2003, pp. 4456-4463, V.15 (23).
Dolle, Mickael, et al, Layered Manganese Oxide Intergrowth Electrodes for Rechargeable Lithium Batteries. 1. Substitution with Co or Ni, Chem. Mater., 2005, pp. 1036-1043, V. 17.
International Search Report for PCT/EP2016/061364, dated Jun. 23, 2016.
Billaud, J., et al., "Na0.67Mn1—xMgx02 (0<x<02): A high capacity cathode for sodium-ion batteries", Energy & Environmental Science, vol. 7, No. 4 (Feb. 21, 2014), p. 1387.
Yuan, D., et al., "P2-type Na0—.67Mn0.65Fe0.2Ni0.15O2 cathode material with high-capacity for sodium-ion battery", Electrochimica Acta, vol. 116, (Nov. 11, 2013), p. 300-305.
Mason, C.W., et al., "Beyond divalent copper: A redox couple for sodium ion battery cathode materials", ECS Electrochemistry Letters, vol. 4 (2015), pp. A41-A44.
Paulsen, J., et al., "Studies of the layered manganese bronzes Na2/3[Mn1—xMx]02 with M=Co, Ni, Li and Li2/3[Mn1—xMx]O2 prepared by ion-exchange", Solid State Ionics, vol. 126 (Nov. 11, 1999), pp. 3-24.
Yabuuchi, et al., "P2-type Nax[Fe1/2Mn1/2]O2 made from earth-abundant elements for rechargeable Na batteries", Nature Materials, vol. 11 (2012), pp. 512-517.
Xu, et al., "Novel copper redox-based cathode materials for room-temperature sodium-ion batteries", Chin. Phys. B, vol. 23 (2014), pp. 118202.
Stoyanova, et al., "Stabilization of over-stoichiometric Mn4+ in layered Na2/3MnO2", J. Solid State Chem., vol. 183, (2010), p. 1372.
Li, et al., "Air-Stable copper-based P2-Na7/9Cu2/9Fe1/9Mn2/3O2 as a new positive electrode material for sodium-ion batteries", Adv. Sei., vol. 2 (2015), p. 1500031.
Aesar Alfa: "Manganese(III) oxide, 98%", Oct. 6, 2011, XP055587605, Retrieved from the Internet: URL:https://www.alfa.com/en/certs8/87791-L03W028.pdf[retrieved on May 10, 2019].
Aesar Alfa: "Certificate of Analysis—Mn2O3", Oct. 6, 2011, XP055587668, Retrieved from the Internet: URL:https://www.alfa.com/en/certs8/87791-I19X025.pdf[retrieved on May 13, 2019].
Aesar Alfa: "Certificate of Analysis—Manganese(III) Oxide 98%", Oct. 6, 2011, XP05558768, Retrieved from the Internet: URL: https://cz.vwr.com/assetsvc/asset/cs_CZ/id/20466688/contents [retrieved on May 13, 2019].

* cited by examiner

BIVALENT METAL DOPING FOR SODIUM MANGANESE OXIDE AS CATHODE MATERIALS FOR SODIUM ION BATTERIES

This application is a National Stage application of International Application No. PCT/EP2016/06134, filed May 20, 2016. This application also claims priority to European Application No. Ep15169133.4, filed May 26, 2015 and European Application No. 15183815.8, filed Sep. 4, 2015.

TECHNICAL FIELD AND BACKGROUND

The invention is related to sodium transition metal cathode materials for a rechargeable sodium battery. The transition metal is composed of mainly manganese and a minority of bivalent metal dopants such as copper, zinc and nickel.

There are worldwide efforts to limit consumption of fossil fuels by introducing "green cars" like electric vehicles. Currently the trend is to use Li rechargeable batteries for these cars. However, this approach is disputed because it might be environmentally difficult to produce sufficient lithium precursors in a sustainable way.

Lithium is abundant; the content of Li only in seawater is estimated to be 230 billion tons. However, lithium is generally occurring in low concentrations which limits the practically available recourses to about 13 million tons according to a recent survey. These resources are insufficient for a world full of "green cars". Besides efforts to expand the availability of lithium, for example by extraction from seawater, Li-free rechargeable batteries, such as sodium rechargeable batteries, receive renewed interest.

In many aspects sodium behaves electrochemically similar to lithium. The theoretical possibility of sodium ion batteries was disclosed in the late 70ties. The successful reversible intercalation and de-intercalation of sodium ions in a cathode material ($Na_xCoO_2$) has been described already in 1981 by Delmas, who showed data of half cells (Na-cathode and sodium metal anode). However, as in lithium batteries, sodium metal cannot be used as anode material in commercial batteries due to dendrite formation, so an anode material adapted to sodium ion batteries is required. In 1999, a group at Dalhousie University developed hard carbon as Na intercalation anode material. Since that time the feasibility of Na batteries is in principle accepted, however, in the shade of the ever-increasing Li rechargeable battery world only relatively few efforts were assigned to develop practical sodium intercalation batteries.

Sodium ion batteries are thus in their early stages of technological development. It is already clear now that layered sodium ion cathodes can be cheap because they need less cobalt or can even be cobalt free. The possibility to avoid cobalt is related to basic crystal-physical properties. Sodium bronzes are perfectly layered without cobalt, whereas in $LiMO_2$, Co is important to stabilize the layered crystal structure, and to prevent cation rearrangement (migration of transition metal to lithium sites) during cycling.

Some prior work about manganese based Na containing cathode materials exists: patent applications US 2010/0248040 A1 and US 2011/0200879 A1 by Sanyo teach to apply cathodes which contain sodium as well as lithium for Li ion batteries (not sodium ion) batteries. US 2010/0248040 A1 describes $Na_aLi_bM_xO_2$ where M is selected from Mn, Fe, Co, Ni. But the cathodes were only used in Li ion batteries. In "P2-type $Na_x[Fe_{1/2}Mn_{1/2}]O_2$ made from earth-abundant elements for rechargeable Na batteries" by Yabuuchi et al. (in *Nature Materials* 11 (2012), 512-517), a cathode material $Na_xFe_{1/2}Mn_{1/2}O_2$ has been disclosed. This cathode material does not contain scarce or toxic elements, and it shows high reversible capacity in Na ion batteries. The cathode material is a true intercalation material. The Fe—Mn-oxide host structure remains intact during sodium de-intercalation and re-insertion. Sodium ion batteries containing high capacity sodium cathodes like $Na_xFe_{1/2}Mn_{1/2}O_2$ and anodes like hard carbon increasingly will be able to challenge the dominance of Li ion batteries, especially for green cars. However, in the known layered sodium metal oxides the capacity loss during electrochemical cycling is not sufficiently low compared to $LiMO_2$. Since the ionic radius of $Na^+$ is higher than $Li^+$, the volume change of unit cell during (de-)intercalation is more important, resulting in the continuous collapse of the layered structure during cycling. In patent application WO2014/132174, $Na_{2/3}MnO_2$ based materials with a low-valent state dopant such as Li, Mg and Ni achieved a high capacity. Recently, copper doped materials, $Na_{2/3}Cu_{1/3}Mn_{2/3}O_2$ were reported by Xu et al. (in Chin. Phys. B 23 (2014) 118202) and by Mason et al. (in ECS Electrochemistry Letters 4 (2015) A41-A44) claiming the reversible change of $Cu^{2+}/Cu^{3+}$ redox couple. Moreover, co-doping with Cu and Fe was applied by Li et al. (in Adv. Sei. 2 (2015) 1500031) and a series of co-doping with Cu, Fe, Al, Mg, Ti, Co, Ni and Zn was reported in CN104617288. All copper containing Mn based materials show low capacities of less than 100 mAh/g because a large amount of Cu doping sacrifices Mn's reaction of the $Mn^{3+}/Mn^{4+}$ redox couple. In Energy & Environmental Science, vol. 4, No 4, p. 1387, J. Billaud discloses $Na_{0.62}Mn_{1-x}Mg_xO_2$ ($0 \leq x \leq 0.2$) cathodes for sodium-ion batteries. P2-type $Na_{0.67}Mn_{0.65}Fe_{0.2}Ni_{015}O_2$ cathode material is disclosed in Electrochimica Acta, vol. 116,2013, pages 300-305.

While all materials in above mentioned prior art have a hexagonal structure, $Na_xMnO_2$ can have an orthorhombic structure which is a distorted P2-type layered structure. P2 orthorhombic layered $Na_{2/3}Mn_{2/3}O_2$ was disclosed by Jens et al. (in Solid State Ionics 126 (1999) 3-24) and by Stoyanova et al. (in J. Solid State Chem. 183 (2010) 1372) without specifying however any electrochemical property. Both literatures pointed out the difficulty to obtain a pure orthorhombic phase of $Na_xMnO_2$ because mixed phases of hexagonal and orthorhombic were obtained.

It remains an open question if sodium rechargeable battery technology will industrially succeed, by allowing a different design when compared to lithium ion battery technology. It is however clear that the rechargeable sodium battery technology has the potential to replace lithium technology if cheap sodium cathode materials with high capacity allow to achieve a high safety and a good calendar life at low cost. This problem is addressed in the present invention.

SUMMARY

In the present invention, specific bivalent metal ions, more particularly any one or more of Cu, Ni and Zn doping is applied to sodium cathode materials for providing a sodium ion battery having large high rate performance and a good calendar life. Viewed from a first aspect, the invention can provide the following product embodiments:

Embodiment 1: a sodium transition metal based cathode material for a rechargeable sodium battery, having a P2 orthorhombic layered bronze crystal structure with space group Cmcm, and having a composition $Na_xM_yMn_{1-y}O_2$ with $0.60 < x < 0.95$, wherein M consists of either one or more elements of the group consisting of Cu, Zn and Ni, with $0 < y < 0.20$.

Embodiment 2: a sodium transition metal based cathode material for a rechargeable sodium battery, having a P2 orthorhombic layered bronze crystal structure with space group Cmcm, and having a composition $Na_xM_yMn_{1-y-y'}Li_{y'}A_zO_2$ with $0.60<x<0.95$, wherein M consists of either one or more elements of the group consisting of Cu, Zn and Ni; A consisting of either one or more elements of the group consisting of Mg, Ti, Fe, Cr and Co, with $0<y<0.20$, $0\leq z<0.2$, $0\leq y'<0.33$, and $z+y'>0$. The addition of dopants Li and A is favourable for achieving a better stability (especially for Ti) and a good capacity (especially for Li).

In these 2 embodiments, the value of y may be $\geq 0.05$. The value of z may be $<0.1$ or even $<0.05$. In another embodiment $x>2/3$.

Embodiment 3: the sodium transition metal based cathode material wherein the composition $Na_xM_yMn_{1-y}O_2$ consists of Na, oxygen and non-sodium metal $M_yMn_{1-y}$, and wherein the non-sodium metal comprises at least 80 mol % manganese, wherein the manganese valence state is between 3.33 and 3.67.

Embodiment 4: the sodium transition metal based cathode material wherein either $0.64 \leq x \leq 0.85$ and $0.05 \leq y < 0.20$, or $0.64 \leq x \leq 0.85$ and $0.05 \leq y \leq 0.15$.

Each of the individual product embodiments described hereabove can be combined with one or more of the product embodiments described before it.

In the various embodiments, the materials show less structural change than non-doped material (y=0) during charge and discharge, thus having high rate performance and a stable cycling behavior, even possibly providing above 90% of capacity retention after 25 cycles. The materials may have a reversible capacity of more than 170 mAh/g when cycled in a half cell versus sodium metal in the voltage range 1.5-4.4V in a rechargeable sodium battery.

It should be mentioned that Xu et al. (in Chin. Phys. B 23 (2014) 118202), Mason et al. (in ECS Electrochemistry Letters 4 (2015) A41-A44), Li et al. (in Adv. Sei. 2 (2015) 1500031) and CN104617288 describe Mn based copper containing cathode materials, having P2-type hexagonal layered structure with a space group, P63/mmc. This is different from the current invention which typically contains more than 80% Mn in the non-sodium metal layer and has the structure with a space group Cmcm induced orthorhombic distortion mainly by Jahn-Teller active ion, $Mn^{3+}$. In addition, the authors deduce that bivalent metal doping is effective to stabilize Cmcm structure and overcome the difficulty of getting the pure phase as discussed in the literature. (Solid State Ionics 126 (1999) 3-24 and J. Solid State Chem. 183 (2010) 1372)

Viewed from a second aspect, the invention can provide the following method embodiments:

Embodiment 5: a method for preparing the sodium transition metal cathode materials described before, comprising the steps of
  providing either one manganese precursor selected from the group consisting of MnOOH, $Mn_2O_3$, $MnO_2$ and $MnCO_3$,
  providing either one sodium precursor selected from the group consisting of NaOH and $Na_2CO_3$,
  providing either one or more dopant precursors selected from the group consisting of $Cu_2O$, CuO, $Cu(OH)_2$, ZnO, NiO and $Ni(OH)_2$,
  mixing stoichiometric amounts of the manganese and dopant precursors, with between 1 and 5% excess amount of sodium precursor versus the stoichiometric amount,
  firing the obtained mixture in an oxygen comprising atmosphere at a temperature between 600 and 1100° C., and
  quenching the fired mixture thereby obtaining a P2 orthorhombic layered bronze crystal structure with space group Cmcm. Quenching can for example take place by removing the fired mixture from the heated furnace into the normal atmosphere at 25° C. In an embodiment, the manganese precursor is $Mn_2O_3$ and the sodium precursor is $Na_2CO_3$.

Embodiment 6: a method for preparing the sodium transition metal cathode materials described before, comprising the steps of
  providing either one mixed metal precursor containing Mn and either one or more of Cu, Zn and Ni, from the group consisting of a hydroxide, oxyhydroxide, carbonate and oxycarbonate,
  mixing a stoichiometric amount of the mixed metal precursor containing Mn and either one or more of Cu, Zn and Ni, with between 1 and 5% excess amount of sodium precursor versus the stoichiometric amount, and
  firing the obtained mixture in an oxygen comprising atmosphere at a temperature between 600 and 1100° C., and
  quenching the fired mixture thereby obtaining a P2 orthorhombic layered bronze crystal structure with space group Cmcm.

Embodiment 7: in embodiment 5 the Mn precursor further comprises either one or more elements of the group consisting of Mg, Ti, Fe, Cr and Co.

Embodiment 8: in embodiment 6 the mixed metal precursor containing Mn and either one or more of Cu, Zn and Ni further comprises either one or more elements of the group consisting of Mg, Ti, Fe, Cr and Co.

Embodiment 9: embodiment 5 may further comprise the step of providing a lithium precursor from the group consisting of LiOH and $Li_2CO_3$, before the step of mixing stoichiometric amounts of the manganese and dopant precursors, with between 1 and 5% excess amount of sodium precursor versus the stoichiometric amount, and wherein the lithium precursor is added to the mixture.

Embodiment 10: embodiment 6 may further comprise the step of providing a lithium precursor from the group consisting of LiOH and $Li_2CO_3$, before the step of mixing a stoichiometric amount of the mixed metal precursor containing Mn and either one or more of Cu, Zn and Ni, with between 1 and 5% excess amount of sodium precursor versus the stoichiometric amount, and wherein the lithium precursor is added to the mixture.

Embodiment 11: in the different method embodiments the manganese precursor may be $Mn_2O_3$, the sodium precursor may be $Na_2CO_3$ and the copper precursor may be $Cu_2O$.

Embodiment 12: in the different method embodiments the manganese precursor may be $Mn_2O_3$, the sodium precursor may be $Na_2CO_3$ and the zinc precursor may be ZnO.

Viewed from a third aspect, the invention can provide the use of the sodium transition metal cathode materials described before in a rechargeable sodium battery.

Viewed from a fourth aspect, the invention can provide a positive electrode of a rechargeable sodium battery comprising the sodium transition metal cathode materials described before. Viewed from a fifth aspect, the invention can provide a rechargeable sodium battery comprising the sodium transition metal cathode materials described before.

DETAILED DESCRIPTION

Figure 1:
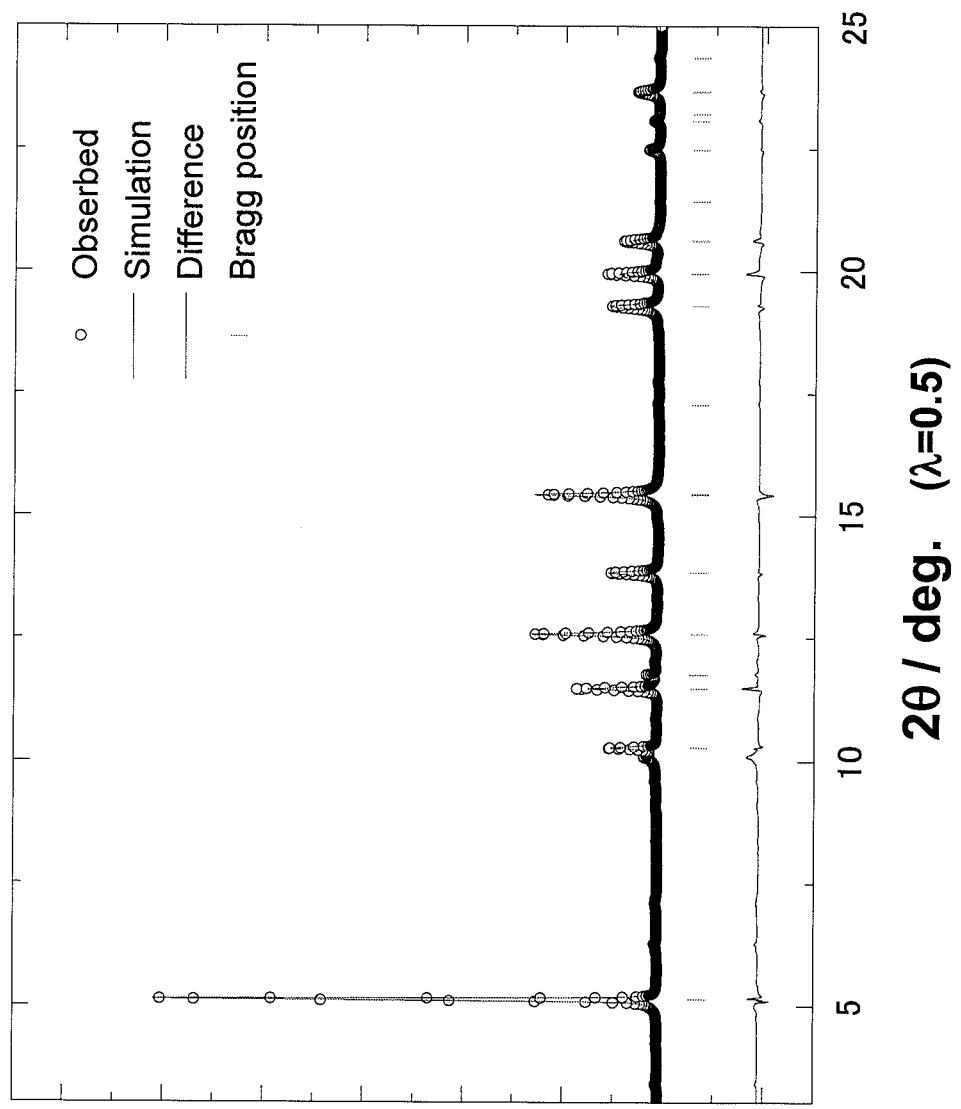
FIG. 1: XRD powder diffraction pattern of as prepared $Na_{2/3}MnO_2$ cathode material

The current invention discloses P2-$Na_{2/3}MnO_2$-based materials for sodium ion batteries, having bivalent metal dopants such as copper, nickel and zinc in the Mn site. In the drawings and the following detailed description, preferred embodiments are described in detail to enable practice of the invention. Although the invention is described with reference to these specific embodiments, it will be understood that the invention is not limited to these preferred embodiments. To the contrary, the invention includes numerous alternatives, modifications and equivalents, as will become apparent from considering the detailed description and the accompanying drawings.

The invention implements the following aspects:
1) the cathode material belongs to the sodium bronze materials and has the layered P2 structure with a space group Cmcm.
2) in $Na_xM_yMn_{1-y}O_2$, where Na is located in sodium layers of the crystal structure and Mn and M are located in the non-sodium metal layers, x is about or preferably larger than 2/3. In this case usually the P2 crystal structure is stable, and a higher value for x potentially increases the reversible capacity in full cells.
3) the non-sodium metal layers contain predominantly manganese being in the trivalent or tetravalent valence state.
4) the M ions in the non-sodium metal layers are presumably in the bivalent valence state, typically $Cu^{2+}$, $Zn^{2+}$ or $Ni^{2+}$. This type of low valence state doping moves manganese near to the tetravalent valence state due to the need for electro-neutrality.
5) preferably the value of y in $Na_xM_yMn_{1-y}O_2$ is less than (about) 0.2.
6) the cycling stability of $Na_xM_yMn_{1-y}O_2$ is much improved compared to that of the non-doped material $Na_{2/3}MnO_2$, due to the suppression of structural change associated with Na and vacancy ordering.

The bivalent M ions that are doped in the sodium manganese oxide can generally replace trivalent Mn, and create tetravalent manganese on octahedral sites. Assuming x=2/3 in $Na_xM_yMn_{1-y}O_2$, the upper limit for y could be 0.20 yielding a composition, $Na_{2/3}M_{0.2}Mn_{0.8}O_2$ because trivalent Mn, which is Jahn-Teller active, is important to obtain the orthorhombic Cmcm structure. Even though the upper limit for x is not examined currently, if it is possible to further increase x, then the upper limit for y could increase. However high doping levels (such as y>0.2) have disadvantages. First it can be difficult to obtain orthorhombic phases. Secondly the amount of manganese—which is the redox-active cation—decreases, thus reducing the reversible capacity. In one embodiment the optimal doping level is between y=0.05 and 0.2 so as to obtain a compound having a high capacity, rate performance and good stability.

The cathode material of the present invention may be prepared by many different methods. In one embodiment, the method is a simple solid state reaction using a manganese precursor (such as MnOOH, $Mn_2O_3$, $MnO_2$, $MnCO_3$ etc.), a sodium precursor (typically $Na_2CO_3$) and a dopant precursor (typically $Cu_2O$, ZnO, NiO, $Ni(OH)_2$). Mixed precursors (such as metal hydroxide, oxyhydroxide, carbonate and oxycarbonate) containing Mn and the bivalent M ions are also possible, they are typically obtained by co-precipitation methods. Stoichiometric amounts of the Mn, dopants and 5% excess Na precursor from stoichiometric amount are mixed and then fired in an oxygen containing atmosphere such as air. The excess Na is useful since there are potentially losses of Na during the preparation at high temperature. The sintering temperature should be high enough to allow for a complete reaction and the formation of crystallites, but not too high to avoid excessive sintering. A preferred temperature range is between 600° C. and 1100° C. In one embodiment the temperature range is 900° C. 1100° C. Cooling condition is also important since the orthorhombic phase is only stable in high temperatures such as above 700° C. All fired samples should be quenched to fix the P2 structure with a space group Cmcm, for example by taking out from the furnace. In one method embodiment the mixture comprising a sodium, manganese precursor and the bivalent M dopant is obtained by dry mixing of copper salt such as oxide, peroxide and sulfide with other precursors.

The sodium cathode materials are integrated in an electrode or current collector, typically an aluminum foil covered by a film containing a mixture of cathode material, binder and conductive additive. Typical binders are polymers such as PVDF and typical conductive additives are carbon fibers or flakes. The cathode electrode is then assembled with an anode electrode (the active material is typically hard carbon) into a cell and electrolyte is added. Typical electrolytes are Na salts (as $NaPF_6$ or $NaClO_4$) dissolved in an organic solvent (e.g. polypropylene). A variety of electrolyte additives can be added to improve cycle stability, safety, high temperature performance etc. A typical additive is fluorinated ethylene carbonate (FEC).

The $Na_xM_yMn_{1-y}O_2$ material of the invention has the following particular embodiments, that can also be combined:
  a positive electrode material having a P2 layered bronze crystal structure with a space group Cmcm.
  a positive electrode material for a rechargeable battery expressed by the formula $Na_xM_yMn_{1-y}O_2$, wherein M is either one or more of Cu, Ni and Zn, wherein 0.60<x<0.95, 0.00<y<0.20, preferably 0.64≤x≤0.85 and 0.05≤y≤0.15.

A rechargeable battery comprising this positive electrode material can have the following embodiments:
  having a reversible cathode capacity of at least 170 mAh/g or even at least 180 mAh/g when cycled between 1.5 and 4.4V in a half cell versus Na,
  during the first charge-discharge cycle in a battery with sodium metal anode, the irreversible capacity is higher than −9%.

The invention will now be illustrated in the following examples:

EXAMPLE 1

Preparation of $Na_xM_yMn_{1-y}O_2$

Figure 2:
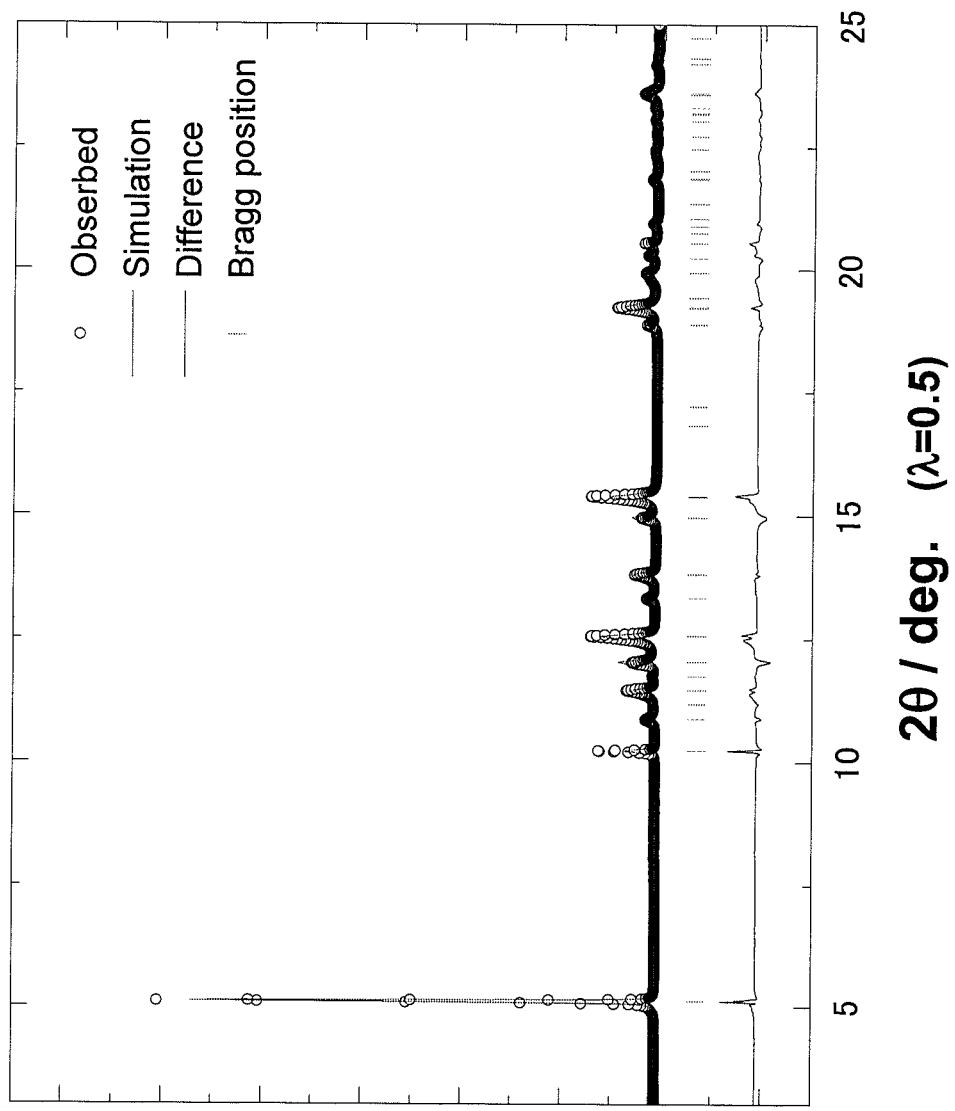
FIG. 2: XRD powder diffraction pattern of as prepared $Na_{2/3}Cu_{0.1}Mn_{0.9}O_2$ cathode material
Figure 3:
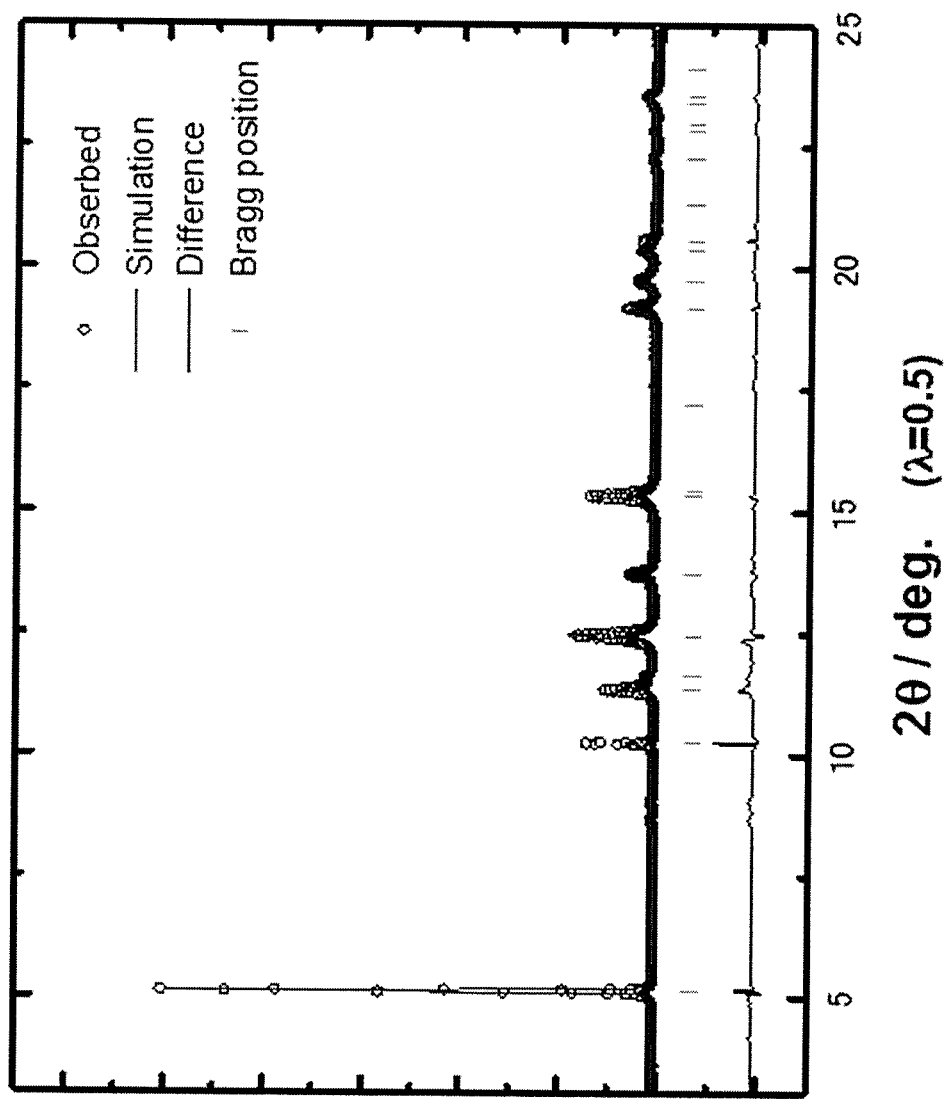
FIG. 3: XRD powder diffraction pattern of as prepared $Na_{2/3}Cu_{0.2}Mn_{0.8}O_2$ cathode material
Figure 4:
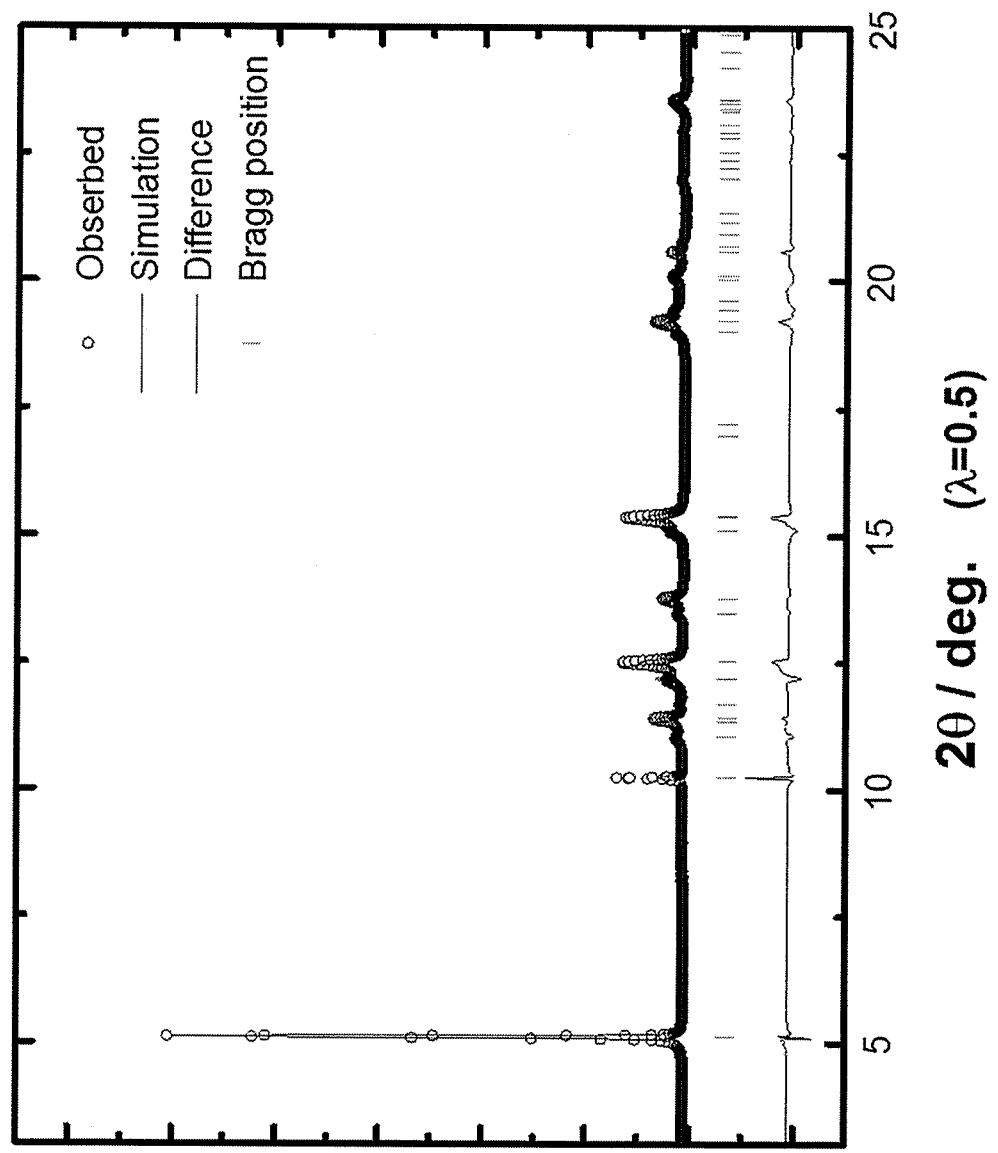
FIG. 4: XRD powder diffraction pattern of as prepared $Na_{2/3}Zn_{0.1}Mn_{0.9}O_2$ cathode material

Non-doped $Na_{2/3}MnO_2$ is prepared from $Na_2CO_3$ and $Mn_2O_3$ powder. After mixing the reagents the mixture is heated at 1050° C. in air and slowly cooled to 500° C., then quenched by taking the reaction product out from the heated furnace and then immediately transferred into an argon-filled glove box, and is labeled R1. A P2 type Na—Cu—Mn oxide is prepared from $Na_2CO_3$, $Mn_2O_3$ and $Cu_2O$ powder. After mixing the reagents the mixture is heated at 1050° C. in air, followed by quenching to yield $Na_{2/3}Cu_{0.1}Mn_{0.9}O_2$ (labeled E1), $Na_{2/3}Cu_{0.2}Mn_{0.8}O_2$ (labeled E2) and $Na_{2/3}Cu_{1/3}Mn_{2/3}O_2$ (labeled E3). Na—Zn—Mn oxide is also prepared from $Na_2CO_3$, $Mn_2O_3$ and zinc oxide (ZnO) powder. After mixing the reagents the mixture is heated at 900° C. in air, followed by quenching to yield $Na_{2/3}Zn_{0.1}Mn_{0.9}O_2$ (labeled E4). Na—Ni—Mn oxide is also prepared from $Na_2CO_3$, $Mn_2O_3$ and nickel hydroxide $(Ni(OH)_2)$ powder. After mixing the reagents the mixture is heated at 1050° C. in air, followed by quenching to yield $Na_{2/3}Ni_{0.1}Mn_{0.9}O_2$ (labeled E5). The obtained powders are investigated by X-ray powder diffraction by using a synchrotron X-ray with 0.5 angstroms of wavelength (at the synchrotron radiation facility SPring 8 in Japan). The obtained XRD pattern of R1 is shown in FIG. 1, together with the fitting curve of a Rietveld analysis. R1 is assigned and fits well to a hexagonal P2-type layered structure with P63/mmc space group. Similarly, the obtained XRD pattern of E1 is shown in FIG. 2, together with the fitting curve of a Rietveld analysis. E1 is assigned and fits well to an orthorhombic P2-type orthorhombic layered structure with a space group, Cmcm. The obtained XRD pattern of E2 is shown in FIG. 3 together with a fitting curve of Rietveld analysis. E2 is assigned and fits well to a hexagonal P2-type layered structure with P63/mmc space group. E3 is also assigned to a hexagonal P2-type layered structure with P63/mmc space group. As for E1, E4 & E5 is assigned and fits well to an orthorhombic P2-type orthorhombic layered structure with a space group, Cmcm as shown in FIG. 4 for E4. In each XRD Figure the observed XRD pattern is given by the small circles (intensity in arbitrary units versus 2θ in degrees), and the Rietveld simulation curve is fitting the pattern as precisely as possible, giving under the curve a line expressing the difference between pattern and fitted curve. Lastly the position of the Bragg peaks is indicated between the pattern and the difference line.

EXAMPLE 2

Electrochemical Testing of $Na_xM_yMn_{1-y}O_2$

The obtained powders are tested in a coin cell with a sodium metal anode. The electrode active loading is 3.2 mg/cm², and the electrode composition is 8:1:1 (active material: binder (PVDF): carbon). The electrolyte is 1 M $NaPF_6$ in PC:EC:DEC=1:1:3. The charge discharge voltage range is 1.5-4.4V, with a current density of 10 mA/g.

Figure 5:
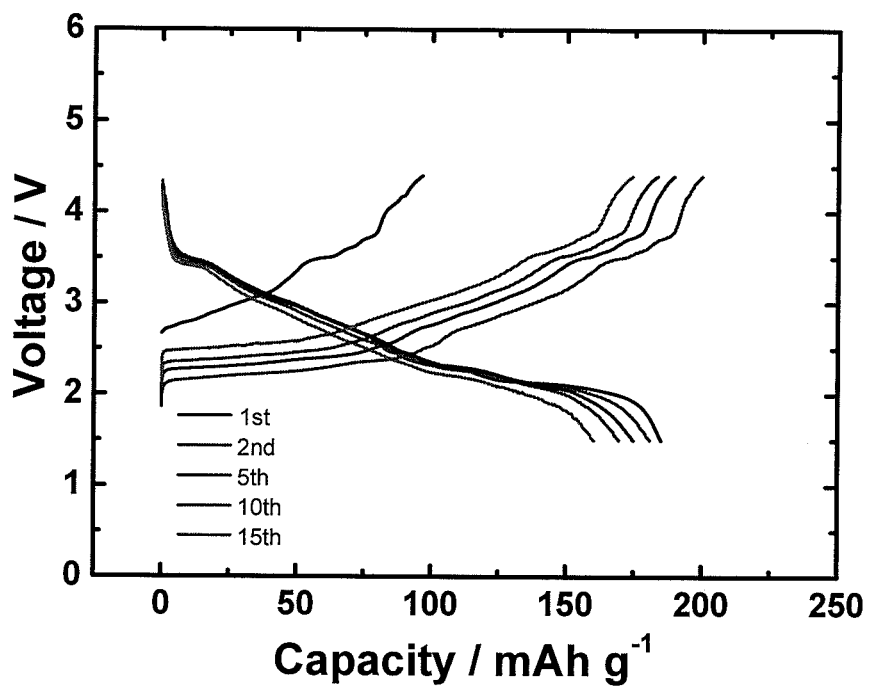
FIG. 5: Results of electrochemical testing of $Na_{2/3}MnO_2$ cathode material
Figure 6:
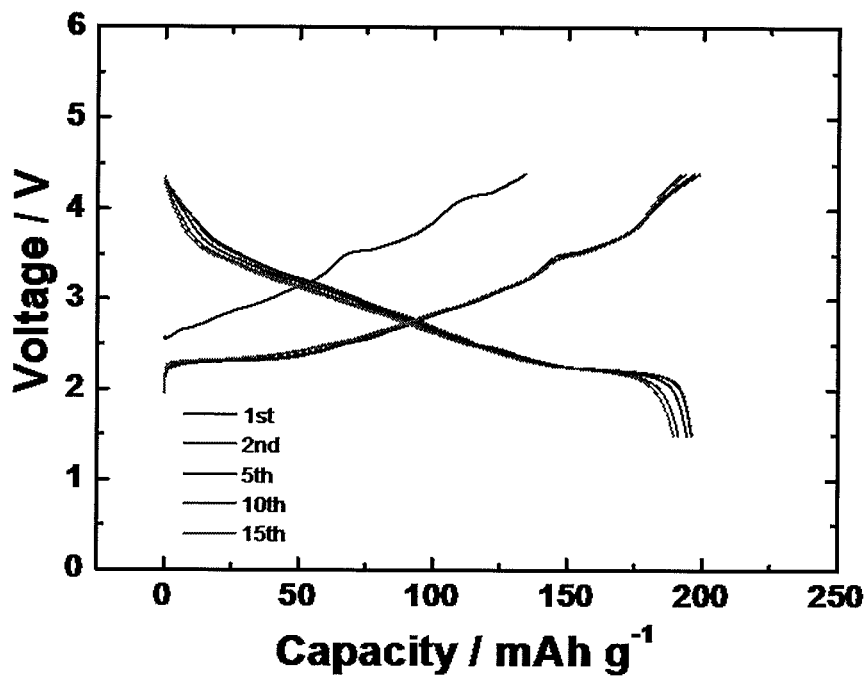
FIG. 6: Results of electrochemical testing of $Na_{2/3}Cu_{0.1}Mn_{0.9}O_2$ cathode material
Figure 7:
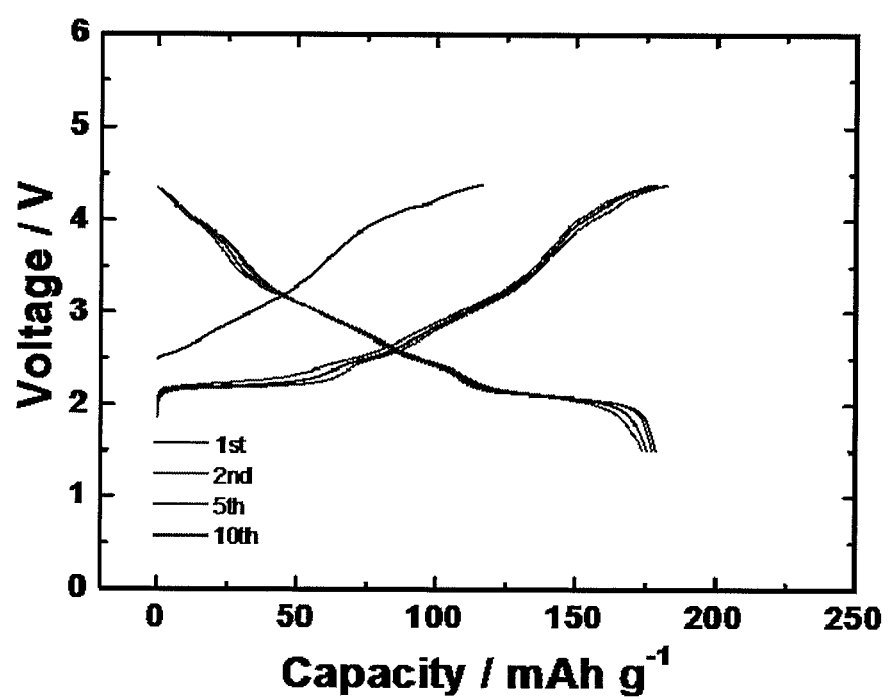
FIG. 7: Results of electrochemical testing of $Na_{2/3}Cu_{0.2}Mn_{0.8}O_2$ cathode material
Figure 8:
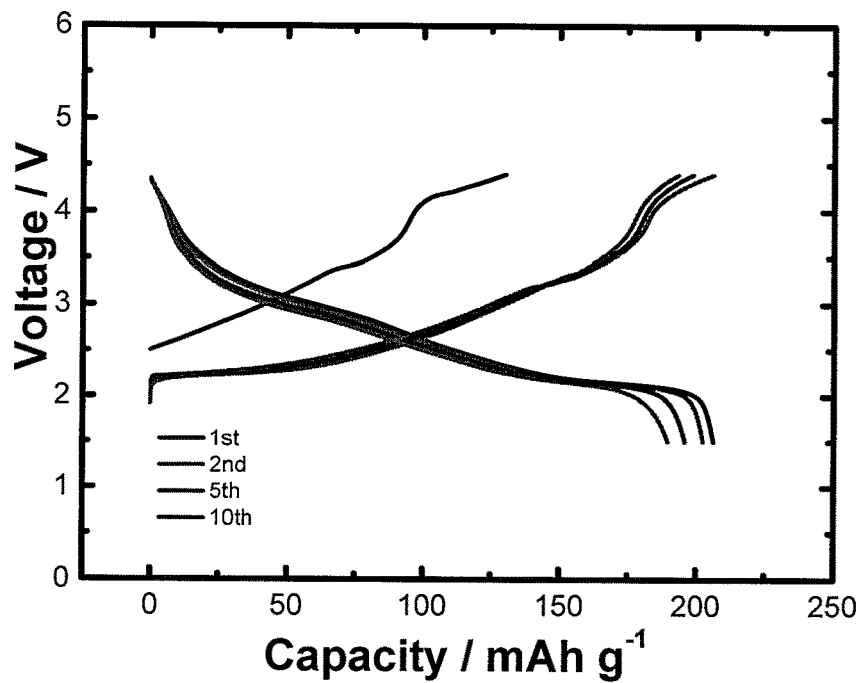
FIG. 8: Results of electrochemical testing of $Na_{2/3}Zn_{0.1}Mn_{0.9}O_2$ cathode material
Figure 9:
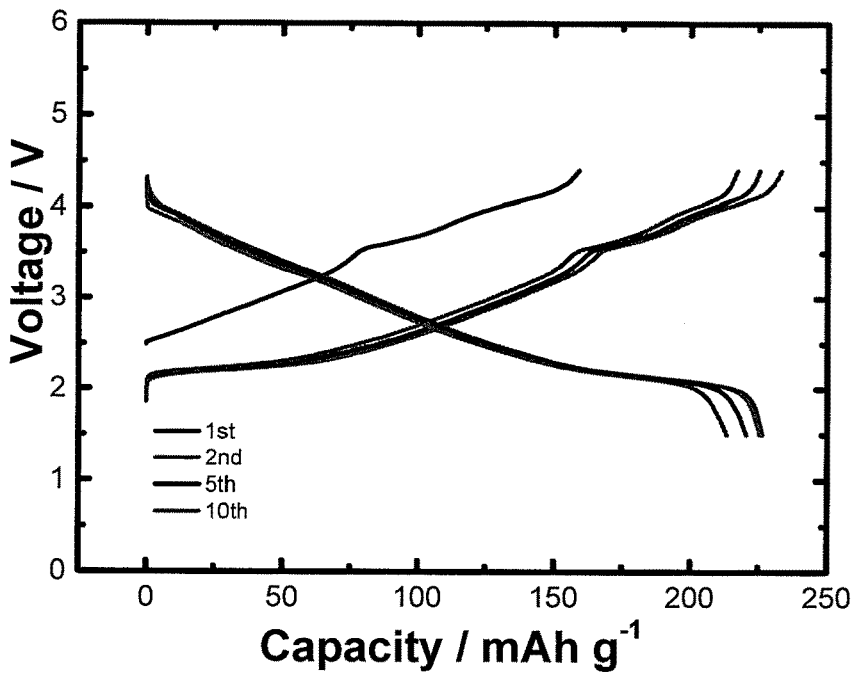
FIG. 9: Results of electrochemical testing of $Na_{2/3}Ni_{0.1}Mn_{0.9}O_2$ cathode material

FIGS. 5, 6 and 7 show the electrochemical properties of $Na_xCu_yMn_{1-y}O_2$, for y=0.0 (R1), 0.1 (E1) and 0.2 (E2), respectively. The charging curves go from cycle 1 to 15 from left to right, the discharge curves go from cycle 1 to 15 from right to left. While R1 shows multi steps during charge and discharge indicating Na ion and vacancy ordering, E1 and E2 show a smooth profile indicating less structural changes during electrochemical cycling. FIGS. 8 and 9 show the electrochemical properties of $Na_xZn_{0.1}Mn_{0.9}O_2$ (E4) and $Na_xNi_{0.1}Mn_{0.9}O_2$ (E5), respectively. Both samples also show smooth profiles and large capacity compared with R1.

Figure 10:
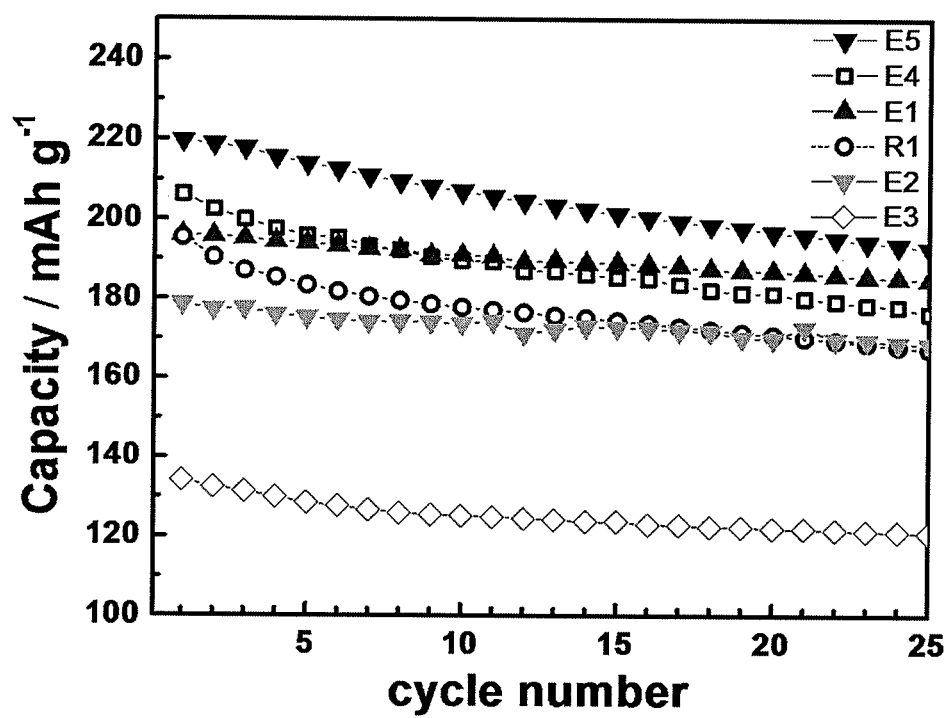
FIG. 10: Results of cycle stability of $Na_{2/3}M_yMn_{1-y}O_2$ cathode material

FIG. 10 shows the cycle stability of R1 and E1-5 and Table 1 gives a summary of the electrochemical results. The capacity retention after 25 cycles is defined as: ($25^{th}$ discharge capacity)/($1^{st}$ discharge capacity). Both E1 and E2 have a better cycle stability than R1, and more than 95% capacity retention after 25 cycles. While E2 shows a good cycle stability, its reversible capacity is decreased due to a high level of Cu substitution for Mn, which is the redox-active cation. Moreover, E3 shows very low capacity and relatively poor cycle stability compared with E1 and E2, suggesting a loss of the redox reaction of Mn ions. E4 and E5 show a relatively large capacity and faster fading compared with E1, and still higher capacity than R1 at 25 cycles. In summary, E1 and E4, having the orthorhombic Cmcm structure, achieve the best capacity and a cycle stability without important capacity losses. The authors deduce that Cu and Zn ions do not participate in the redox reaction but act as a stabilizer of the crystal structure. In case of E5, while Mn is still a main redox center, Ni ions also participate in the reaction and result in slight increase in operating voltage.

TABLE 1

Sample information

| Sample ID | Composition | Space group | $1^{st}$ discharge capacity/ mAhg$^{-1}$ | Capacity retention after 25 cycles |
|---|---|---|---|---|
| E1 | $Na_{2/3}Cu_{0.1}Mn_{0.9}O_2$ | Cmcm | 194.4 | 95.1% |
| E2 | $Na_{2/3}Cu_{0.2}Mn_{0.8}O_2$ | P63/mmc | 176.1 | 95.8% |
| E3 | $Na_{2/3}Cu_{1/3}Mn_{2/3}O_2$ | P63/mmc | 134.1 | 90.0% |
| E4 | $Na_{2/3}Zn_{0.1}Mn_{0.9}O_2$ | Cmcm | 206.3 | 85.5% |
| E5 | $Na_{2/3}Ni_{0.1}Mn_{0.9}O_2$ | Cmcm | 219.6 | 87.8% |
| R1 | $Na_{2/3}MnO_2$ | P63/mmc | 185.4 | 90.2% |

EXAMPLE 3

Rate Performance of $Na_xM_yMn_{1-y}O_2$

Figure 11:
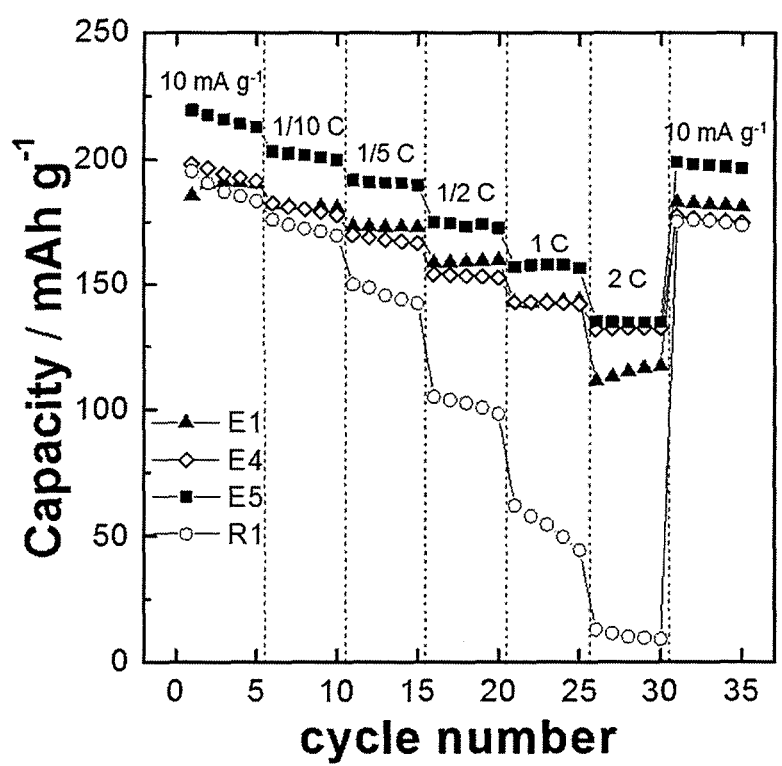
FIG. 11: Rate capability of $Na_{2/3}MnO_2$, $Na_{2/3}Cu_{0.1}Mn_{0.9}O_2$, $Na_{2/3}Zn_{0.1}Mn_{0.9}O_2$ and $Na_{2/3}Ni_{0.1}Mn_{0.9}O_2$.

The rate performance of coin cells made in the same way as Example 2 is examined. The charge discharge voltage range is 1.5-4.4V, with a variety of current density. We set 1C=200 mAh/g for all samples and every charging process is done at C/20 (=10 mAh/g). C/20, C/10, C/5, C/2, 1C and 2C rates are applied to the coin cells for discharge and they are cycled 5 times for each current density. FIG. 11 shows the rate performance of $Na_{2/3}MnO_2$ (R1), $Na_{2/3}Cu_{0.1}Mn_{0.9}O_2$ (E1), $Na_{2/3}Zn_{0.1}Mn_{0.9}O_2$ (E4) and $Na_{2/3}Ni_{0.1}Mn_{0.9}O_2$ (E5), respectively. Capacity retention at high rate is much improved by 10% Cu, Ni or Zn doping. The capacity retention at 2C rate is shown in Table 2. Structural changes during charge and discharge are supposed to be a main factor of the very poor rate performance of R1. Small amounts of Cu, Zn and Ni doping stabilize the layered structure and support a fast diffusion of Na ions.

TABLE 2

Capacity retention at 2 C rate

| Sample ID | Composition | Space group | 2 C rate |
|---|---|---|---|
| E1 | $Na_{2/3}Cu_{0.1}Mn_{0.9}O_2$ | Cmcm | 59.7% |
| E4 | $Na_{2/3}Zn_{0.1}Mn_{0.9}O_2$ | Cmcm | 68.0% |

TABLE 2-continued

Capacity retention at 2 C rate

| Sample ID | Composition | Space group | 2 C rate |
|---|---|---|---|
| E5 | $Na_{2/3}Ni_{0.1}Mn_{0.9}O_2$ | Cmcm | 61.2% |
| R1 | $Na_{2/3}MnO_2$ | P63/mmc | 6.8% |

The invention claimed is:

1. A rechargeable sodium battery comprising a sodium transition metal based cathode material having a P2 orthorhombic layered bronze crystal structure with space group Cmcm, and having a composition $Na_xM_yMn_{1-y}O_2$ with $0.60<x<0.95$, wherein M is selected from one or more elements of the group consisting of Cu, Zn and Ni, with $0<y<0.20$.

2. A rechargeable sodium battery comprising a sodium transition metal based cathode material having a P2 orthorhombic layered bronze crystal structure with space group Cmcm, and having a composition $Na_xM_yMn_{1-y'}Li_{y'}A_zO_2$ with $0.60<x<0.95$, wherein M is selected from one or more elements of the group consisting of Cu, Zn and Ni; and A is selected from one or more elements of the group consisting of Mg, Ti, Fe, Cr and Co, with $0<y<0.20$, $0\le z<0.2$, $0\le y'<0.33$, and $z+y'>0$.

3. The rechargeable sodium battery of claim 1, wherein the composition $Na_xM_yMn_{1-y}O_2$ consists of Na, oxygen and non-sodium metal $M_yMn_{1-y}$, wherein the non-sodium metal comprises at least 80 mol % manganese, and wherein the manganese valence state is between 3.33 and 3.67.

4. The rechargeable sodium battery of claim 1, wherein $0.64\le x\le 0.85$ and $0.05\le y\le 0.15$.

5. A method for preparing a rechargeable sodium battery cell comprising:
providing an electrolyte, an anode electrode and a cathode electrode,
assembling the anode electrode and the cathode electrode into a cell, and
adding the electrolyte to the cell,
wherein the cathode electrode comprises a sodium transition metal based cathode material, a current collector, a binder and a conductive additive, and
wherein the sodium transition metal based cathode material has a P2 orthorhombic layered bronze crystal structure with space group Cmcm, and a composition $Na_xM_yMn_{1-y}O_2$ with $0.60<x<0.95$, wherein M is selected from one or more elements of the group consisting of Cu, Zn and Ni, with $0<y<0.20$.

6. A method for preparing a rechargeable sodium battery cell comprising the steps of:
providing an electrolyte, an anode electrode and a cathode electrode,
assembling the anode electrode and the cathode electrode into a cell, and
adding the electrolyte to the cell,
wherein the cathode electrode comprises a sodium transition metal based cathode material, a current collector, a binder and a conductive additive, and
wherein the sodium transition metal based cathode material has a P2 orthorhombic layered bronze crystal structure with space group Cmcm, and a composition $Na_xM_yMn_{1-y'}Li_{y'}A_zO_2$ with $0.60<x<0.95$, wherein M is selected from one or more elements of the group consisting of Cu, Zn and Ni; and A is selected from one or more elements of the group consisting of Mg, Ti, Fe, Cr and Co, with $0<y<0.20$, $0\le z<0.2$, $0\le y'<0.33$, and $z+y'>0$.

7. The method according to claim 5, wherein the sodium transition metal based cathode material is manufactured by a process comprising:
providing a manganese precursor selected from the group consisting of MnOOH, $Mn_2O_3$, $MnO_2$ and $MnCO_3$,
providing a sodium precursor selected from the group consisting of NaOH and $Na_2CO_3$,
providing one or more M-precursors selected from the group consisting of $Cu_2O$, CuO, $Cu(OH)_2$, ZnO, NiO and $Ni(OH)_2$,
mixing stoichiometric amounts of the manganese and M-precursors, with between 1 and 5% excess amount of the sodium precursor versus the stoichiometric amount,
firing the obtained mixture in an oxygen comprising atmosphere at a temperature between 600 and 1100° C., and
quenching the fired mixture thereby obtaining a P2 orthorhombic layered bronze crystal structure with space group Cmcm.

8. The method according to claim 5, wherein the sodium transition metal based cathode material is manufactured by a process comprising:
providing a mixed metal precursor comprising Mn and one or more compounds selected from the group consisting of a metal hydroxide, metal oxyhydroxide, metal carbonate and metal oxycarbonate, wherein the metal comprises one or more of Cu, Zn or Ni;
providing a sodium precursor selected from the group consisting of NaOH and $Na_2CO_3$,
mixing a stoichiometric amount of the mixed metal precursor, with between 1 and 5% excess amount of the sodium precursor versus the stoichiometric amount,
firing the obtained mixture in an oxygen comprising atmosphere at a temperature between 600 and 1100° C., and
quenching the fired mixture thereby obtaining a P2 orthorhombic layered bronze crystal structure with space group Cmcm.

9. The method according to claim 5, wherein the sodium transition metal based cathode material is manufactured by a process comprising:
providing a manganese precursor comprising a component selected from the group consisting of MnOOH, Mn2O3, $MnO_2$ and $MnCO_3$, and one or more elements selected from the group consisting of Mg, Ti, Fe, Cr and Co,
providing a sodium precursor selected from the group consisting of NaOH and $Na_2CO_3$,
providing one or more M-precursors selected from the group consisting of $Cu_2O$, CuO, $Cu(OH)_2$, ZnO, NiO and $Ni(OH)_2$,
mixing stoichiometric amounts of the manganese precursor with between 1 and 5% excess amount of the sodium precursor versus the stoichiometric amount,
firing the obtained mixture in an oxygen comprising atmosphere at a temperature between 600 and 1100° C., and
quenching the fired mixture thereby obtaining a P2 orthorhombic layered bronze crystal structure with space group Cmcm.

10. The method according to claim 6, wherein the sodium transition metal based cathode material is manufactured by a process comprising:

providing a mixed metal precursor comprising Mn; one or more compounds selected from the group consisting of a metal hydroxide, metal oxyhydroxide, metal carbonate and metal oxycarbonate, wherein the metal comprises one or more of Cu, Zn or Ni; and one or more elements selected from the group consisting of Mg, Ti, Fe, Cr and Co, providing a sodium precursor selected from the group consisting of NaOH and $Na_2CO_3$, mixing a stoichiometric amount of the mixed metal precursor, with between 1 and 5% excess amount of the sodium precursor versus the stoichiometric amount, firing the obtained mixture in an oxygen comprising atmosphere at a temperature between 600 and 1100° C., and quenching the fired mixture thereby obtaining a P2 orthorhombic layered bronze crystal structure with space group Cmcm.

11. The method according to claim 7, wherein the manganese precursor is $Mn_2O_3$, the sodium precursor is $Na_2CO_3$ and the M-precursor is $Cu_2O$.

12. The method according to claim 7, wherein the manganese precursor is $Mn_2O_3$, the sodium precursor is $Na_2CO_3$ and the M-precursor is ZnO.

13. The method according to claim 9, wherein the manganese precursor is $Mn_2O_3$, the sodium precursor is $Na_2CO_3$ and the M-precursor is $Cu_2O$.

14. The method according to claim 9, wherein the manganese precursor is Mn2O3, the sodium precursor is $Na_2CO_3$ and the M-precursor is ZnO.

* * * * *